(12) United States Patent  (10) Patent No.: US 7,557,870 B2
Saccomanno et al.  (45) Date of Patent: Jul. 7, 2009

(54) NUCLEAR HARDENED LIQUID CRYSTAL DISPLAY

(75) Inventors: Robert J. Saccomanno, Montville, NJ (US); Kanghua Lu, Waldwick, NJ (US)

(73) Assignee: Honeywell International Inc., Morristown, NJ (US)

( * ) Notice: Subject to any disclaimer, the term of this patent is extended or adjusted under 35 U.S.C. 154(b) by 153 days.

(21) Appl. No.: 11/843,538

(22) Filed: Aug. 22, 2007

(65) Prior Publication Data

US 2007/0285596 A1  Dec. 13, 2007

Related U.S. Application Data

(62) Division of application No. 11/013,697, filed on Dec. 17, 2004, now Pat. No. 7,271,854.

(51) Int. Cl.
*G02F 1/1335* (2006.01)
*G02F 1/1333* (2006.01)
(52) U.S. Cl. ............................ 349/14; 349/110; 349/96
(58) Field of Classification Search .................. 349/14, 349/110, 96
See application file for complete search history.

(56) References Cited

U.S. PATENT DOCUMENTS

| 5,856,060 | A * | 1/1999 | Kawamura et al. ........... 430/201 |
| 7,163,739 | B2 * | 1/2007 | Koike et al. .................. 428/343 |
| 7,393,924 | B2 * | 7/2008 | Vitaliano et al. ............. 530/350 |
| 7,411,204 | B2 * | 8/2008 | Appleby et al. ........... 250/505.1 |
| 7,473,843 | B2 * | 1/2009 | Wang et al. .................... 174/36 |

* cited by examiner

*Primary Examiner*—Mike Qi
(74) *Attorney, Agent, or Firm*—Ingrassia Fisher & Lorenz, P.C.

(57) ABSTRACT

A nuclear hardened liquid crystal display (LCD) and a method for hardening a liquid crystal display is provided. The nuclear hardened LCD can include an LCD glass laminate stack. The LCD glass laminate stack can include a front transparent substrate, a back substrate, and a liquid crystal material disposed between the front transparent substrate and the back substrate. The nuclear hardened LCD can further include a protective laminate stack positioned in front of the LCD glass laminate stack. The protective laminate stack can include a volume absorbing filter, that absorbs selective electromagnetic energy throughout a thickness of the volume absorbing filter.

8 Claims, 8 Drawing Sheets

NUCLEAR HARDENED LIQUID CRYSTAL DISPLAY

RELATED APPLICATIONS

This application claims the benefit of U.S. Provisional Application No. 60/531,059 filed Dec. 19, 2003, the disclosure of which is herein incorporated by reference in its entirety, and is a divisional of U.S. patent application Ser. No. 11/013,697, now U.S. Pat. No. 7,271,854.

FIELD OF THE INVENTION

The present invention generally relates to information display systems and, more particularly to information display systems hardened to the effects of electromagnetic energy.

BACKGROUND OF THE INVENTION

One of the most important effects following a nuclear detonation event is a strong pulse of electromagnetic energy released in very broad frequency bandwidth. This electromagnetic energy is primarily distributed as gamma-ray and X-ray radiation; "thermal flash" that includes: ultraviolet (UV), visible, and infrared (IR) light; radio-frequency (RF) waves; and electromagnetic pulse (EMP).

Figure 1:
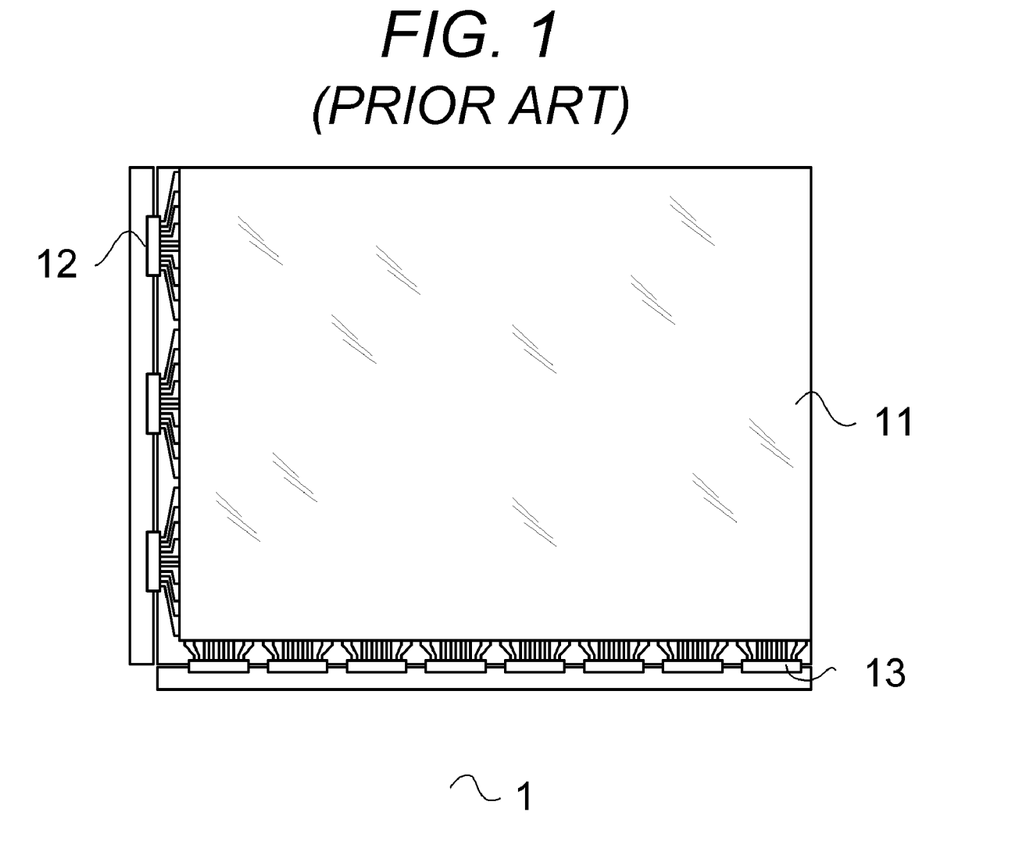
FIG. 1 illustrates a prior art liquid crystal display (LCD) module including LCD glass and driver circuits.

Many systems rely on information displays, such as, for example, an active matrix liquid crystal display (AMLCD). Conventional information displays, however, are susceptible to damage by electromagnetic energy. FIG. 1 depicts a conventional active matrix liquid crystal display module 1. Active matrix liquid crystal display module 1 is positioned in front of a backlight (not shown) and modulates light from the backlight to provide a graphical image to a viewer. Active matrix liquid crystal display module 1 includes a glass laminate stack 11, which contains an electrically active matrix of pixel elements that are driven by row driver circuits 12 and column driver circuits 13 to produce the light modulation.

Figure 2:
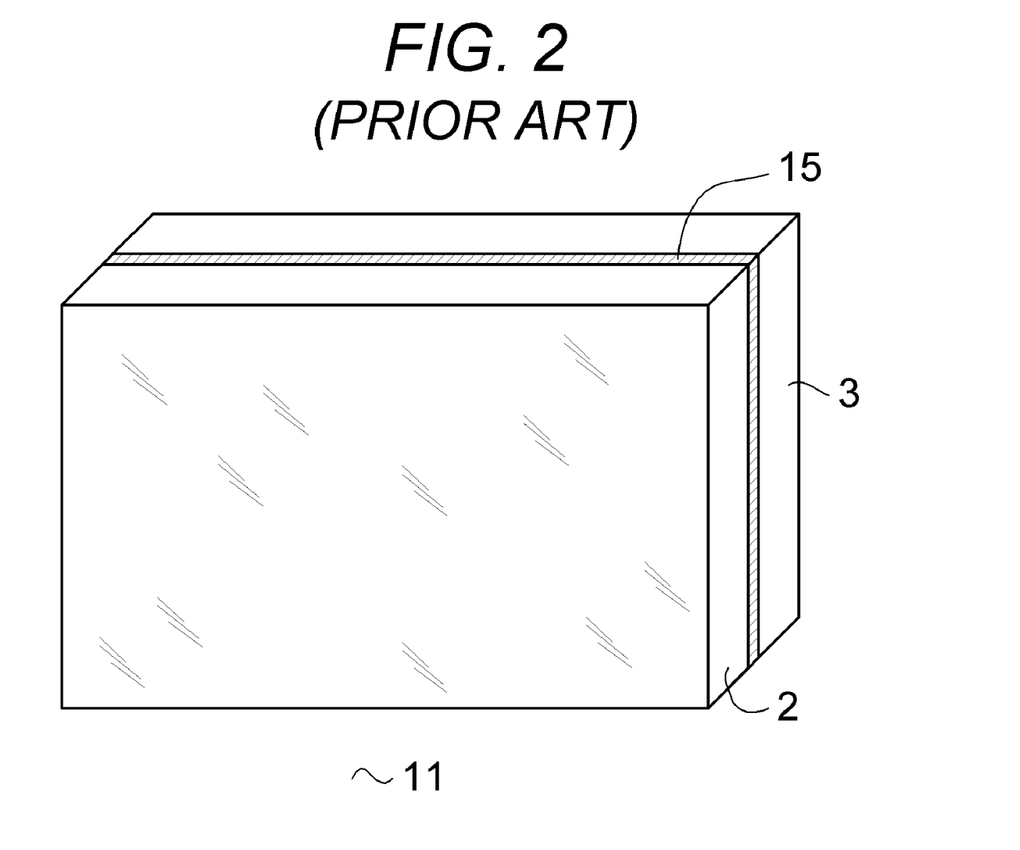
FIG. 2 shows a perspective view of the prior art LCD glass of FIG. 1, including a passive plate and an active plate.

FIG. 2 shows a glass laminate stack 11 of a conventional active matrix liquid crystal display. Glass laminate stack 11 consists of a front transparent substrate (also called a front passive plate) 2 facing the viewer and a back substrate (also called a rear active plate) 3 positioned in front of a backlight assembly sandwiching a thin layer of liquid crystal material 15.

Figure 3:
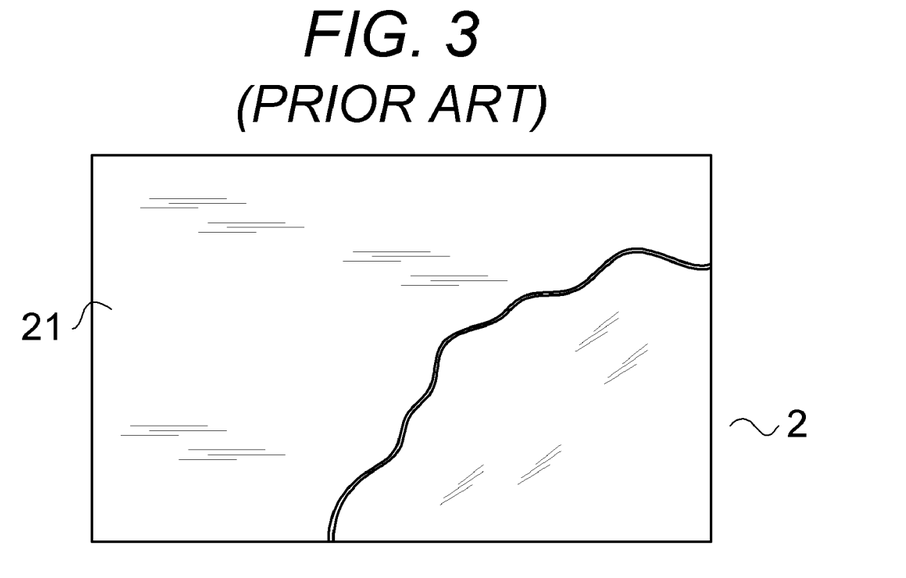
FIGS. 3 and 4 illustrate further details of the prior art passive plate of FIG. 2.
Figure 4:
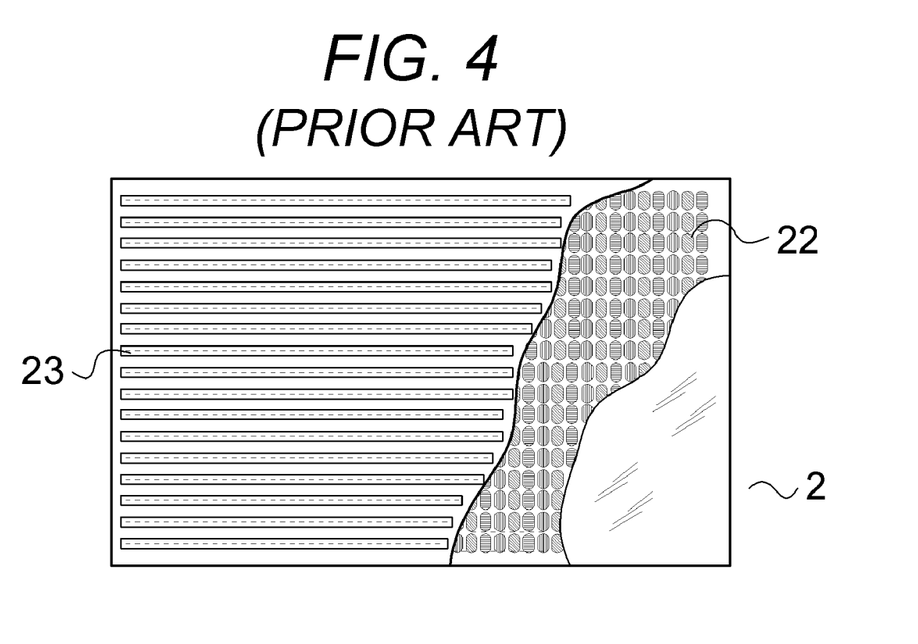

FIGS. 3 and 4 show further details of a front transparent substrate 2 of a conventional active matrix liquid crystal display. A front polarizer film 21 (also referred to as an analyzer) covers the viewer-facing side of the front transparent substrate 2. The opposing side of the front transparent substrate 2 is covered in layered sequence from the glass substrate by color filters 22 and transparent row electrodes 23.

Figure 5:
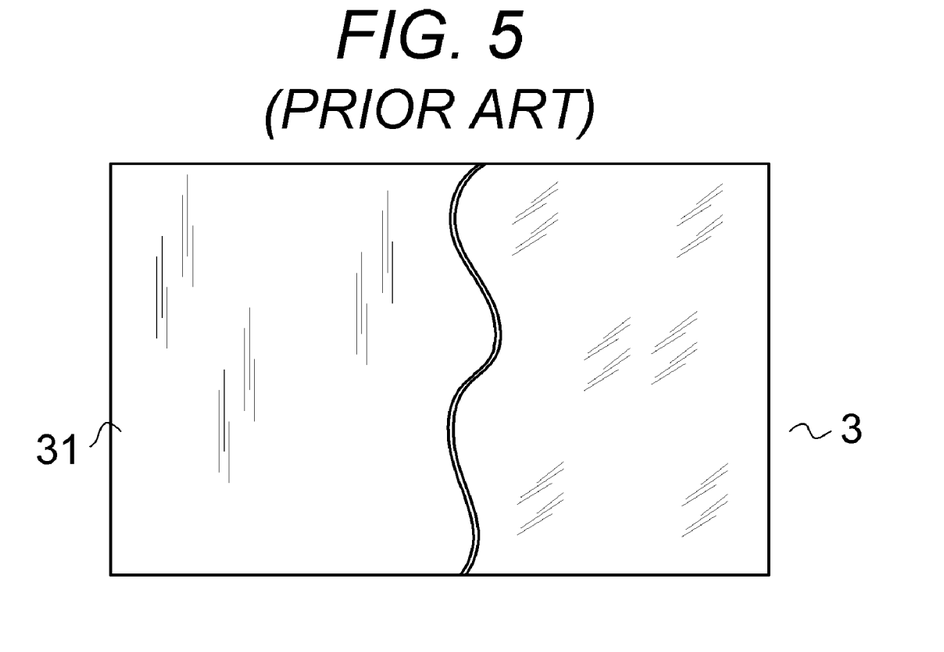
FIGS. 5 and 6 illustrate further details of the prior art active plate of FIG. 2.
Figure 6:
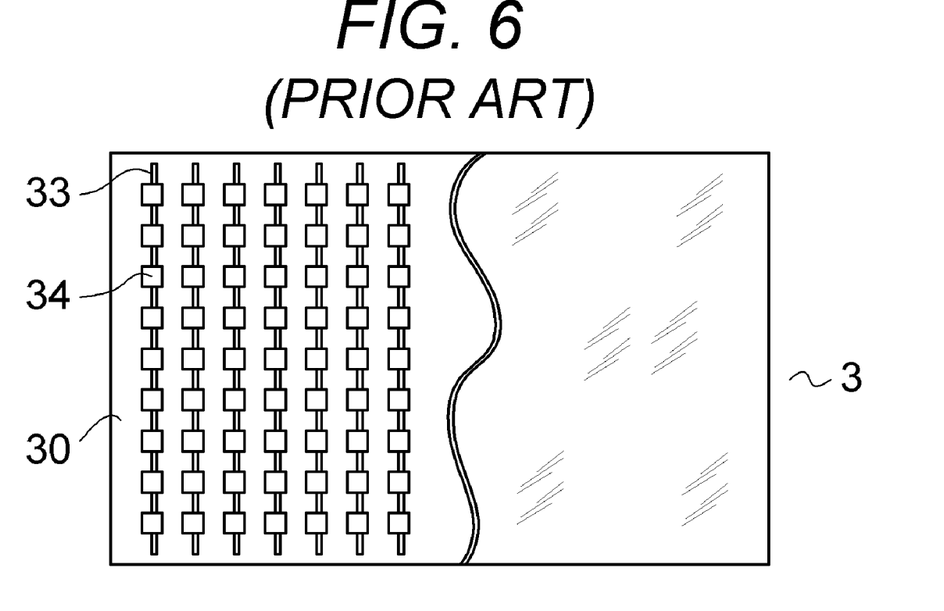

FIGS. 5 and 6 show further details of a back substrate 3 of a conventional active matrix liquid crystal display. A rear polarizer film 31, polarizing light in a sense that is opposite of the front polarizer film 21, in the case of normally white conventional active matrix liquid crystal display, covers the backlight-facing side of back substrate 3. The opposing side of back substrate 3 is covered with active circuitry 30 including column electrodes 33 and pixel transistors 34. The active circuitry 30 is fabricated from silicon structures, such as, amorphous silicon, polysilicon, and single crystal silicon.

Because AMLCDs absorb a percentage (currently >90%) of light energy, thermal flash radiation from a nuclear detonation can damage information displays by overheating absorbing materials within the information displays, such as, for example, polarizers and color filters. Thermal radiation can also cause liquid crystals to outgas or boil, resulting in void formation and cell-gap non-uniformity. Gamma radiation and X-rays knock electrons free from atomic nuclei that are struck. In order to protect an electronic device, electrons that are knocked loose in a shielding layer should be conducted immediately to ground. Electromagnetic pulse (EMP) and electromagnetic interference (EMI) affect information displays through three mechanisms, electric field (E-field), magnetic field (h-field), and radio frequency (RF) coupling.

Challenges hardening AMLCDs arise because conventional methods of hardening that maximize the absorption of damaging radiation also significantly reduce the display luminance reaching the viewer. Problems also arise because conventional shielding mechanisms, such as mesh windows, induce undesirable moiré effects.

Thus, there is a need to overcome these and other problems with the prior art and to provide nuclear hardening methods and apparatus that maximize luminance of the display while selectively absorbing damaging radiation.

SUMMARY OF THE INVENTION

According to various embodiments, a nuclear hardened liquid crystal display (LCD) is provided. The nuclear hardened liquid crystal display can include an LCD glass laminate stack that includes a front transparent substrate, a back substrate, and a liquid crystal material disposed between the front transparent substrate and the back substrate. The nuclear hardened liquid crystal display can further include a protective laminate stack positioned in front of the LCD glass laminate stack, wherein the protective laminate stack includes a volume absorbing filter that absorbs selective electromagnetic energy.

According to various embodiments, another nuclear hardened liquid crystal display (LCD) is provided. The nuclear hardened liquid crystal display can include an active matrix liquid crystal display, wherein the active matrix liquid crystal display comprises a glass laminate stack. The nuclear hardened liquid crystal display can further include a backlight disposed on a back side of the active matrix liquid crystal display, a volume absorbing filter, and a shielding plate. The shielding plate includes a conductive layer, wherein the shielding plate is at least one of coated on the volume absorbing filter and coated on a substrate that is bonded to the volume absorbing filter.

According to various other embodiments, a method for hardening an active matrix liquid display is provided. The method includes positioning a thermal volume absorbing material at a front of the active matrix liquid display, wherein a thickness of the thermal volume absorbing material is one millimeter or more. An anti-reflection coating can be provided on a viewer side of the thermal volume absorbing material. A radio frequency shielding coating can be provided on a backlight side of the thermal volume absorbing material.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to various embodiments of the invention, examples of which are illustrated in the accompanying drawings. Wherever possible, the same reference numbers will be used throughout the drawings to refer to the same or like parts.

Figure 7:
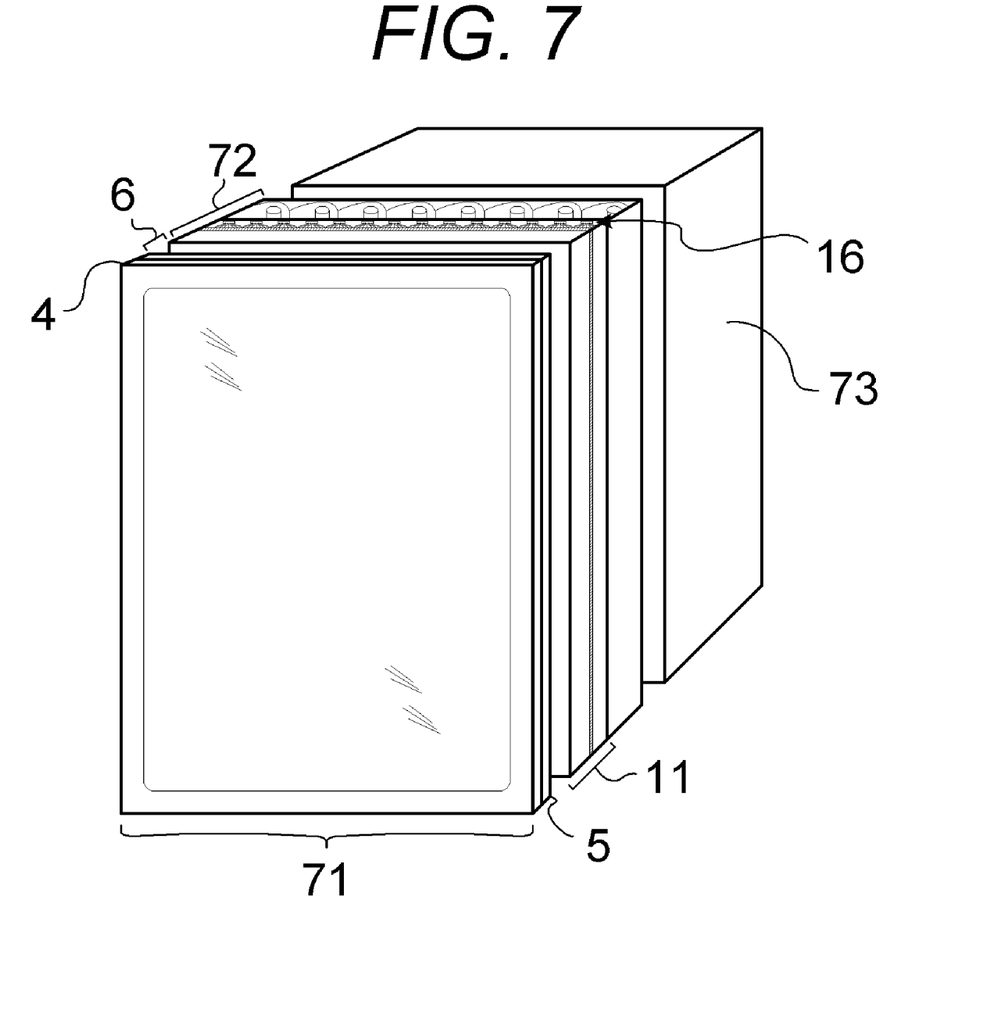
FIG. 7 shows a perspective view of a nuclear hardened LCD display in accordance with various embodiments of the present teachings.

Referring to FIG. 7, a nuclear hardened liquid crystal display (AMLCD) can include several assemblies, such as, for example, a protective laminate stack 71, an AMLCD and a backlight chamber 72, and an electronics chamber 73.

The AMLCD and backlight chamber 72 can include a glass laminate stack 11, such as, for example, AMLCD module 1, shown in FIG. 1. Protective laminate stack 71 can be positioned in front of, but thermally separated from, glass laminate stack 11. In various embodiments, the thermal separation can be provided by an air gap 6, although other forms of thermal separation may be suitable. In various embodiments, the pulse energy, material specifications, and environmental conditions (e.g. cold-start warmup time) can allow the protective laminate stack to be bonded to the AMLCD. In various embodiments, the protective laminate stack 71 can comprises a volume absorbing filter 4. In various embodiments, volume absorbing filter 4 can absorb selective electromagnetic energy throughout a thickness of the volume absorbing filter. For example, volume absorbing filter 4 can absorb selected spectrum of IR and/or notch in the visible band. According to various embodiments, volume absorbing filter 4 can transmit a substantial portion of light energy corresponding to at least a red color band, a green color band, and a blue color band. In various embodiments, volume absorbing filter 4 can be a neutral density filter if reduced luminance can be tolerated.

According to various embodiments, protective laminate can include volume absorbing filter 4 on its viewer side (opposing AMLCD glass laminate stack 11) and shielding plate 5 on its backlight side (facing AMLCD glass laminate stack 11). Shielding plate 5 can be a transparent conductive layer, such as, for example, an indium-tin-oxide (ITO) layer. In order to minimize Fresnel reflections, the volume absorbing filter 4 can be bonded to the shielding plate 5 using a refractive index matching adhesive, and the ITO may be optionally index-matched (to air if it faces the air gap) as well. Because the ITO coating has some absorption in the thermal flash wavelength band, it, like the volume absorbing filter 4 can contribute to the thermal flash attenuation. In various other embodiments, an infrared reflecting film can be added to the stack, thereby preferentially rejecting infrared as opposed to visible light.

During a thermal flash event, the AMLCD glass laminate stack 11 will absorb thermal energy via its color filters 22 (shown in FIG. 4), as well as obstructions due to the active circuitry 30, including row lines, column lines 33, thin film transistors 34, storage capacitors, black matrix coatings and the rear polarizer film 31 (shown in FIG. 6). To protect the glass laminate stack, protective laminate stack 71 can function as a thermal volume absorbing element that dissipates the flash energy and heats up more at its viewer facing (front) surface than at its rear surface. This is because more energy per unit area is available at the proximal surface versus at the distal surface, simply because energy is removed as the flash propagates through the thickness of the protective laminate stack. The air gap 6 can prevent the thermal energy from being conducted to the AMLCD glass laminate stack 11. Due in part to this thermal protection, a commercial off the shelf AMLCD display module 1 (e.g. color filters, polarizers, and liquid crystal) can be incorporated into a hardened display.

In various embodiments, volume absorbing filter 4 and shielding plate 5 can be fabricated from glass. In various other embodiments, thermally shock-resistant borosilicate glass can be used, although other materials may be more suitable due to availability, and in such cases, the stack must be engineered to avoid overstressing. Neutral density glass is available from, for example, Schott Corporation (Yonkers, N.Y.). Borosilicate glasses can handle thermal shock better than their soda-lime equivalents and are much less expensive than heat conducting substrates such as glass-like sapphire. However, one does not always have a choice in the selection of thermal shock aspects of absorbing glass. The protective laminate stack 71 will remove the thermal flash energy, and in doing-so, will heat-up and slowly dissipate its heat over time.

According to various embodiments, the shielding plate of the protective laminate stack can provide protection against those portions of the electromagnetic spectrum between 500 kilohertz (kHz) and 400 megahertz (MHz) which are typically referred to as radio frequency (RF) energy. The effect of such RF frequencies on electronic equipment is referred to as electromagnetic interference (EMI). A minimal amount of display electronics is located in the AMLCD and backlight compartment 72, along with a light source such as stick fluorescent lamps. The remainder of the display electronics is contained within the electronics compartment 73, which is a separate EMI-shielded enclosure. Nonetheless, this separation does not provide a suitable hardened display by itself, because the large area AMLCD glass laminate stack 11 provides a large RF window into the backlight compartment 72.

Figure 8:
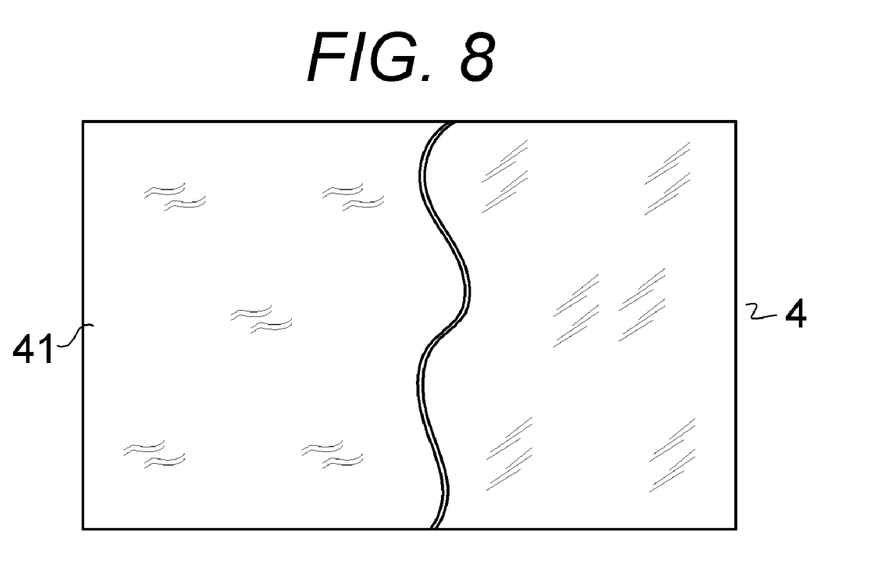
FIGS. 8 and 9 illustrate further details of a neutral density plate in accordance with various embodiments of the present teachings.
Figure 9:
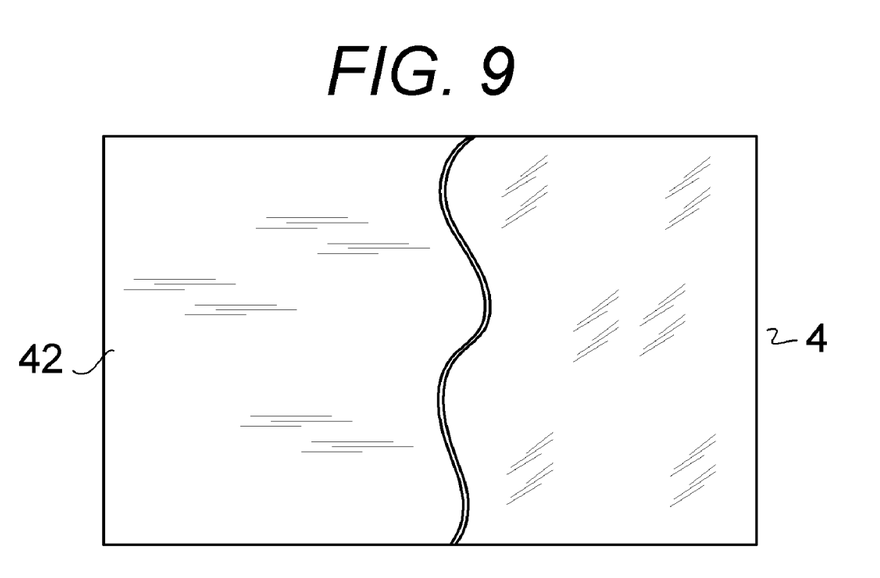

Further details of the volume absorbing filter 4 are shown in FIGS. 8 and 9. The viewer-facing side of the neutral density plate 4 can be covered with an antireflective coating 41. The antireflective thin film coating 41 in combination with the neutral density substrate can enhance sunlight readability for the display.

In various embodiments, the protective stack 71 can further include a polarizer film 42 aligned to the polarization axis of the AMLCD's analyzer 21 (shown in FIG. 3). In various embodiments, polarizer film 42 can be lamintated to volume absorbing filter 4 using an optically transparent adhesive, of minimal thickness, that can handle high temperatures. Positioning the substitute polarizer film 42 in front of the shielding plate 5 can also result in additional ambient light rejection. In various embodiments, polarizing film 42 can be a polyvinyl alcohol (PVA) layer between two triacetate films (TAC).

According to various embodiments, the polarizing film can be removed from the glass laminate stack.

In various embodiments, the volume absorbing filter can be color-neutral, although some color correction may be available based on the AMLCD type. Triple-notch and/or electrochromic filter layers can be added to the volume absorbing filter 4 in various embodiments.

Figure 10:
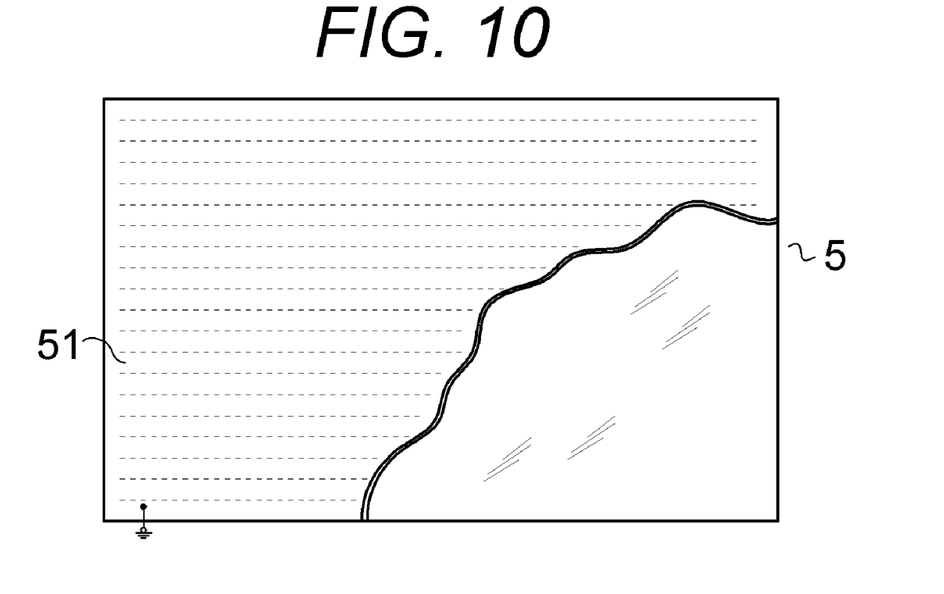
FIGS. 10 and 11 illustrate further details of a shielding plate in accordance with various embodiments of the present teachings.

Further details of the shielding plate 5 are shown in FIG. 10. The viewer facing side of the shielding plate 5 can be coated with a continuous transparent conductive layer 51. In various embodiments, transparent conductive layer 51 can be indium tin oxide with a resistance of 10-20 ohms per square available from Thin Film Devices (Anaheim, Calif.). The continuous transparent conductive layer 51 can be electrically bonded around its periphery to the surrounding constructive enclosure. The combined effect of the shielding plate 5 and the volume absorbing filter 4 may reduce the brightness of the light emitted from the display by approximately 50%, therefore, a complete hardened AMLCD display unit will require a bright backlight. The indium tin oxide coating can provide a degree of protection against gamma radiation and X-rays because of the relatively large atomic radii of indium and tin atoms respectively. Should a mesh structure be employed, the thermal flash flux through the aperture of the mesh will be unattenuated, even though the average flux leaving the mesh is at a lower level than the incident flux.

According to various embodiments, the materials between the viewer side of the AMLCD glass laminate stack 11 and polarizer film 42 should not exhibit appreciable birefringence, otherwise color effects may be noticeable.

Figure 11:
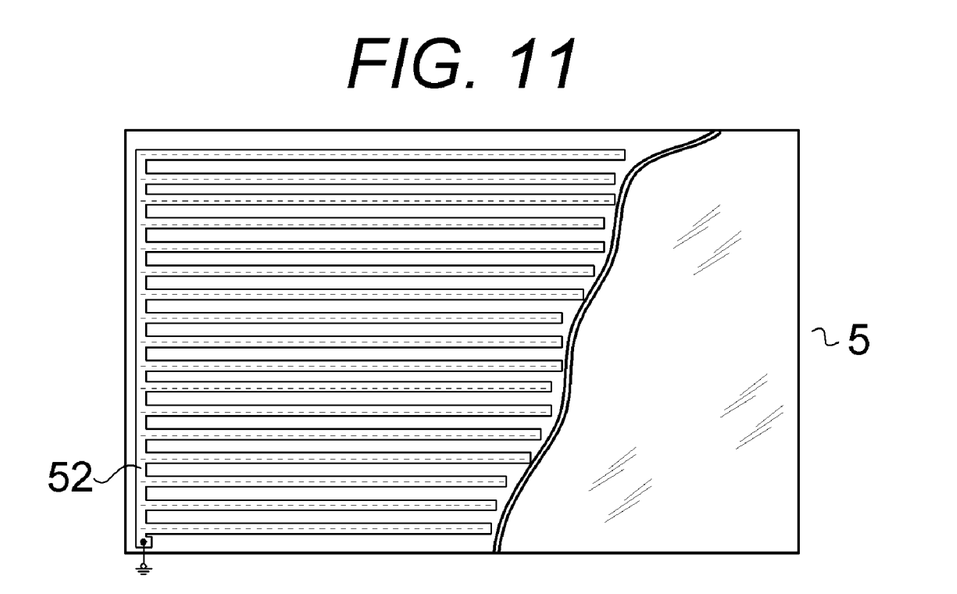

Referring to FIG. 11, in various embodiments, the backlight-facing side of the shielding plate 5 can be covered with patterned transparent conductors 52 that are electrically connected at one end only and have the same effective radio frequency (RF) length as the row electrodes 23, shown in FIG. 4. The patterned transparent conductors 52 can be grounded to provide RF protection.

Figure 12A:
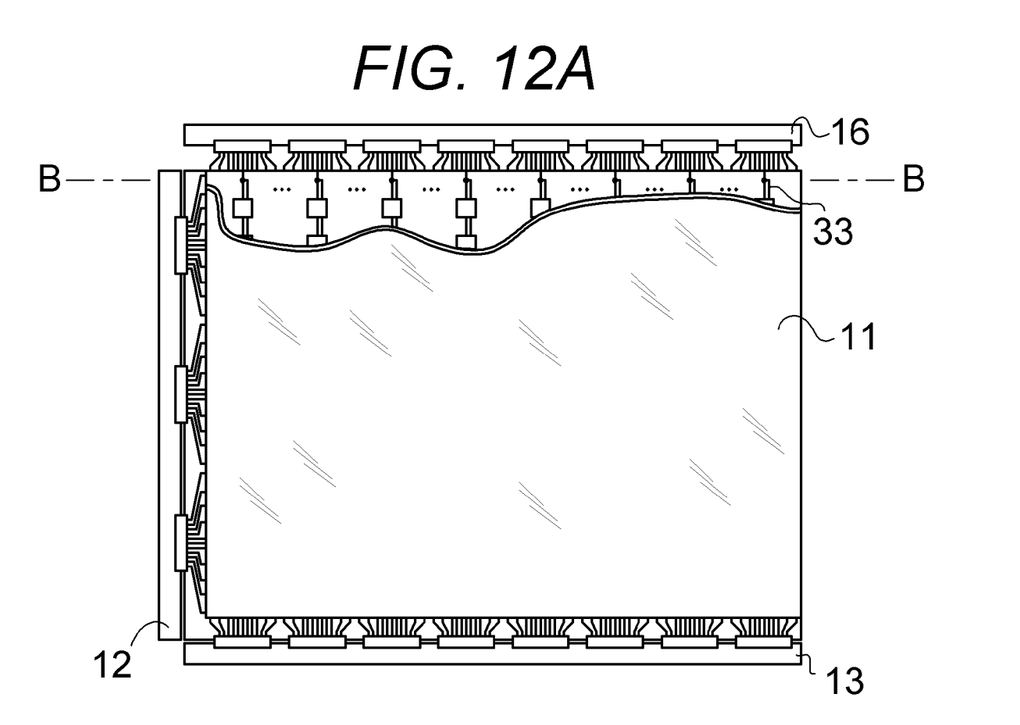
FIG. 12A illustrates a hardened liquid crystal display (LCD) module including dual column driver circuits in accordance with various embodiments of the present teachings.
Figure 12B:
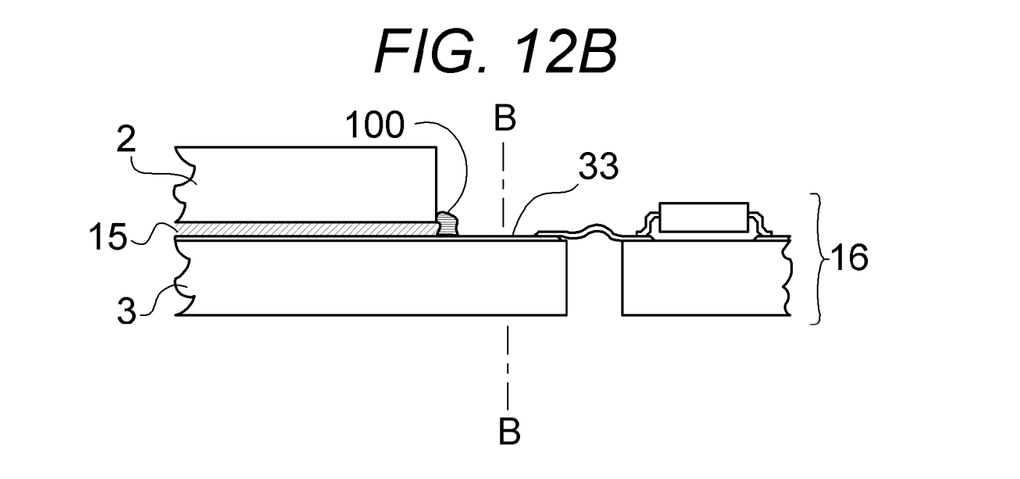
FIG. 12B illustrates a sectional view of the LCD module of FIG. 12A along section line 'B' in accordance with various embodiments of the present teachings.

Referring now to FIGS. 12A and 12B, in various embodiments, the AMLCD glass laminate stack 11 can be cut, exposing the column electrodes 33. A set of redundant column driver circuits 16 can be added to the liquid crystal display module 1 and electrically connected to each column electrode 33. This can provides additional RF protection by eliminating the dipole effect for the RF frequency associated with the length of the column electrode 33, because both ends of each column are now terminated by Thevinin equivalent to ground.

As shown in the side view of FIG. 12B, the AMLCD glass laminate stack 11 can be cut so that the edge of back substrate 3 extends beyond the end of front transparent substrate 2. An edge seal 100 can be applied to prevent liquid crystal material 15 from escaping. The second set of column driver circuits 16 can be electrically connected to each of the column electrode 33.

In various embodiments, additional layers of indium tin oxide or other transparent materials known in the art can be added as continuous and/or patterned coatings. Patterned layers can be configured, for example, to absorb certain frequencies.

In various other embodiments, a protective laminate stack can be fitted to a projection display. Projection displays have the added concern that the projection lens can focus thermal flash energy onto the micro-display, thereby leading to very high power concentrations. According to various embodiments, fold mirrors and projection screens can be fitted with protective laminate stack as described herein to ensure the power density at the micro-display (and any other components within the system) is below damaging levels.

One of ordinary skill in the art understands that other display technologies, both emissive and non-emissive, would also benefit from this invention; e.g. electroluminescent, electophoretic, suspended particle, field emissive display, plasma display, and any other electro-optical medium. For displays/materials having unknown absorptance characteristics, measurements can be made at the Optical Measurements Facility (OMF) in the Materials and Manufacturing Directorate of the Air Force Research Laboratory (Wright-Patterson Air Force Base, Ohio). Of significant importance is the ability to measure these characteristics at all relavant wavelengths, and at all angles of incendence, since the angle between the energy from the thermal flash and display-normal is random Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A nuclear hardened liquid crystal display (LCD) comprising:
   an active matrix liquid crystal display, wherein the active matrix liquid crystal display comprises a glass laminate stack;
   a backlight disposed on a back side of the active matrix liquid crystal display;
   a volume absorbing filter; and
   a shielding plate comprising a conductive layer, wherein the shielding plate is at least one of coated on the volume absorbing filter and coated on a substrate that is bonded to the volume absorbing filter.

2. The nuclear hardened LCD of claim 1, wherein the volume absorbing filter comprises:
   a thermal volume absorber comprising glass;
   an anti-reflective coating, wherein the anti-reflective coating is at least one of coated on a viewer side of the thermal volume absorber and coated on a substrate that is bonded to the thermal volume absorber; and
   a polarizing film on a back side of the thermal volume absorber, wherein the a polarization of the polarizing film is aligned to a polarization axis of a front polarizer film of an active matrix liquid crystal display.

3. The nuclear hardened LCD of claim 2, wherein the absorbing plate performs at least one of IR absorbing filtering, triple notch filtering, and neutral density filtering.

4. The nuclear hardened LCD of claim 1, wherein the shielding layer has a resistance of about 20 ohms per square or less.

5. The nuclear hardened LCD of claim 1, wherein the shielding layer has a resistance of about 5-10 ohms per square.

6. The nuclear hardened LCD of claim 1, wherein the shielding layer comprises a plurality of at least one of non-patterned conductors and patterned conductors, wherein the plurality of conductors is electrically grounded.

7. The nuclear hardened LCD of claim 1, further comprising at least a second conductive coating.

8. The nuclear hardened LCD of claim 7, wherein the at least second conductive coating is patterned to absorb certain frequencies.

* * * * *